US011400832B2

(12) United States Patent
Nakamura et al.

(10) Patent No.: US 11,400,832 B2
(45) Date of Patent: Aug. 2, 2022

(54) ELECTRICALLY POWERED VEHICLE

(71) Applicant: Toyota Jidosha Kabushiki Kaisha, Toyota (JP)

(72) Inventors: Toru Nakamura, Toyota (JP); Tadatsugu Udono, Toyota (JP); Chiaki Kanda, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 171 days.

(21) Appl. No.: 16/994,825

(22) Filed: Aug. 17, 2020

(65) Prior Publication Data

US 2021/0061129 A1 Mar. 4, 2021

(30) Foreign Application Priority Data

Aug. 27, 2019 (JP) .............................. JP2019-154541

(51) Int. Cl.
*H02J 7/00* (2006.01)
*B60L 58/27* (2019.01)
(Continued)

(52) U.S. Cl.
CPC ............. *B60L 58/27* (2019.02); *B60L 50/60* (2019.02); *B60L 53/00* (2019.02); *B60L 58/14* (2019.02); *B60L 58/24* (2019.02); *H01M 6/5038* (2013.01); *H02J 7/0048* (2020.01); *H02J 7/007194* (2020.01); *B60K 6/28* (2013.01); *B60L 58/25* (2019.02); *B60Y 2200/91* (2013.01); *B60Y 2200/92* (2013.01); *B60Y 2300/91* (2013.01); *Y02T 10/70* (2013.01); *Y02T 90/14* (2013.01); *Y04S 10/126* (2013.01)

(58) Field of Classification Search
CPC .......... Y02T 10/70; Y02T 90/14; B60L 58/14; B60L 58/24–25; B60L 58/27; B60L 53/00; H02J 7/0048; H02J 7/007194; B60Y 2200/91–92; H01M 6/5038; Y04S 10/126
USPC ............................................ 320/109; 701/22
See application file for complete search history.

(56) References Cited

U.S. PATENT DOCUMENTS

| 8,116,915 B2 | 2/2012 | Kempton | |
|---|---|---|---|
| 2015/0239405 A1* | 8/2015 | Kai | B60L 53/18 219/202 |

(Continued)

FOREIGN PATENT DOCUMENTS

| JP | 2015-162950 A | 9/2015 |
|---|---|---|
| JP | 2018-007428 A | 1/2018 |

*Primary Examiner* — Zixuan Zhou
(74) *Attorney, Agent, or Firm* — Dinsmore & Shohl LLP

(57) ABSTRACT

An electrically powered vehicle includes a target battery that is externally chargeable and externally power feedable, a sensor that detects a temperature of the target battery, and a controller that performs charging control, discharging control, and temperature increase control of the target battery. The temperature increase control is control for increasing a temperature of the target battery by selecting any of external electric power and battery power and generating heat with the selected electric power. The controller receives a leveling signal that requests for power leveling. When the temperature of the target battery is lower than a first temperature during external power feed requested by the leveling signal, the controller performs the temperature increase control by using battery power before the external power feed requested by the leveling signal.

7 Claims, 9 Drawing Sheets

(51) Int. Cl.
*B60L 50/60* (2019.01)
*B60L 53/00* (2019.01)
*B60L 58/14* (2019.01)
*H01M 6/50* (2006.01)
*B60L 58/24* (2019.01)
*B60L 58/25* (2019.01)
*B60K 6/28* (2007.10)

(56) References Cited

U.S. PATENT DOCUMENTS

| | | | |
|---|---|---|---|
| 2018/0001774 A1* | 1/2018 | Murata | H02J 7/007 |
| 2018/0262019 A1* | 9/2018 | Homma | H02J 7/007192 |
| 2021/0221254 A1* | 7/2021 | Abe | B60L 53/14 |

* cited by examiner

ELECTRICALLY POWERED VEHICLE

CROSS REFERENCE TO RELATED APPLICATIONS

This nonprovisional application claims priority to Japanese Patent Application No. 2019-154541 filed with the Japan Patent Office on Aug. 27, 2019, the entire contents of which are hereby incorporated by reference.

BACKGROUND

Field

The present disclosure relates to an electrically powered vehicle and particularly to control of a temperature of a battery included in an electrically powered vehicle.

Description of the Background Art

Japanese Patent Laying-Open No. 2018-007428 discloses an electrically powered vehicle including an externally chargeable battery (a vehicle-mounted battery), a heater that increases a temperature of the battery, and a controller that controls the heater. "External charging" refers to charging of a vehicle-mounted battery with electric power supplied from the outside of the vehicle (which is also referred to as "external electric power" below).

The controller of the electrically powered vehicle is intermittently started up while the electrically powered vehicle waits for charging start time set by a timer, in an externally chargeable state (that is, a state that the electrically powered vehicle is ready to receive supply of electric power from the outside of the vehicle). When a temperature of the battery at the time of start-up of the controller is equal to or lower than a prescribed temperature, the controller drives the heater with external electric power to increase a temperature of the battery.

SUMMARY

An electric power system dependent on a large-scale power plant (an intensive energy resource) possessed by an electric power utility company has recently been reviewed and a scheme for utilizing an energy resource possessed by each demand side (which is also referred to as "demand side resources (DSR)" below) has been constructed. The DSR functions as distributed energy resources (which are also referred to as "DER" below).

A virtual power plant (VPP) has been proposed as a scheme for utilizing the DSR for an electric power system. The VPP refers to a scheme in which a large number of DER (for example, DSR) are put together according to a sophisticated energy management technology that makes use of the Internet of Things (IoT) and the DER are remotely controlled as being integrated as if the DER functioned as a single power plant. In the VPP, a utility that puts the DER together to provide an energy management service is referred to as an "aggregator." An aggregator can level electric power with an approach called demand response (DR).

DR is an approach to balancing between supply and demand of electric power by issuing a prescribed request to each demand side by using a demand response signal (which is also referred to as a "DR signal" below). DR is broadly categorized into two types of DR that requests for suppression of power demand or backfeeding (which is also referred to as "DR suppression" below) and DR that requests for increase in power demand (which is also referred to as "DR increase" below).

The DR suppression signal may request an electrically powered vehicle to carry out backfeeding (that is, external power feed). "External power feed" refers to power feed to the outside of a vehicle with electric power stored in a vehicle-mounted battery. The vehicle-mounted battery may not exhibit sufficient output performance in a low-temperature state. Therefore, in an electrically powered vehicle, temperature increase of the battery may be controlled to increase the temperature of the battery to a prescribed temperature or higher before carrying out external power feed. While external power feed is requested by a DR suppression signal, however, it is estimated that an energy resource is insufficient. Therefore, it is not preferable from a point of view of energy management to drive the heater with external electric power as in the electrically powered vehicle described in Japanese Patent Laying-Open No. 2018-007428.

The present disclosure was made to solve the problems above, and an object thereof is to provide an electrically powered vehicle capable of temperature increase control of a battery suitable for energy management.

An electrically powered vehicle according to the present disclosure includes a battery (which is also referred to as a "target battery" below) that is externally chargeable and externally power feedable, a sensor that detects a temperature of the target battery, and a controller that performs charging control, discharging control, and temperature increase control of the target battery. The temperature increase control is control for increasing a temperature of the target battery by selecting any of external electric power (that is, electric power supplied from outside of the electrically powered vehicle) and battery power (that is, electric power stored in the target battery or a battery mounted on the electrically powered vehicle other than the target battery) and generating heat with the selected electric power. The controller receives a signal (which is also referred to as a "leveling signal" below) that requests for power leveling. When the temperature of the target battery is lower than a first temperature during external power feed requested by the leveling signal, the controller performs the temperature increase control by using battery power before the external power feed requested by the leveling signal.

When the temperature of the target battery is low, the controller performs the temperature increase control of the target battery before external power feed requested by the leveling signal. Thus, sufficient output performance of the target battery is more readily secured in carrying out external power feed requested by the leveling signal. As the temperature increase control is performed by using battery power rather than external electric power, the temperature of the target battery can be increased without using an energy resource outside the electrically powered vehicle. The electrically powered vehicle can thus perform the temperature increase control of the target battery in a manner suitable for energy management.

The "leveling signal" refers to any signal that requests for power leveling, and it is not limited to a DR signal with which an electric utility (for example, an electric power utility company or an aggregator) requests a demand side to level electric power. For example, a signal that requests for power leveling in trading of electric power between individuals is also encompassed in the "leveling signal." The "electrically powered vehicle" refers to a vehicle that travels with battery power and may be an electric vehicle (EV) or a plug-in hybrid vehicle (PHV).

The electrically powered vehicle may further include an electric heater that heats the target battery with electricity. In the temperature increase control, the controller may drive the electric heater by supply of the selected electric power to the electric heater and control the electric heater to generate heat for increasing the temperature of the target battery. According to such a configuration, the temperature increase control of the target battery can suitably be performed by using the electric heater.

In the electrically powered vehicle, when current time is within a period during which the leveling signal requests for the external power feed and the temperature of the target battery is lower than the first temperature while the electrically powered vehicle is parked in an externally chargeable and externally power-feedable state, the controller may perform the temperature increase control to increase the temperature of the target battery to the first temperature or higher by using battery power and thereafter carry out the external power feed by allowing the target battery to discharge.

When the leveling signal is requesting for external power feed, the controller according to the configuration above can increase the temperature of the target battery with battery power and thereafter carries out the external power feed. According to such a controller, external power feed requested by the leveling signal can suitably be carried out while energy is appropriately managed.

In the electrically powered vehicle, when the current time is not within a period during which the leveling signal requests for the external power feed and the temperature of the target battery is lower than a second temperature while the electrically powered vehicle is parked in an externally chargeable and externally power-feedable state, the controller may perform the temperature increase control by using external electric power.

When the leveling signal is not requesting for external power feed, the controller can perform the temperature increase control of the target battery with external electric power. According to such a configuration, shortage in battery power can be suppressed. Though any purpose for temperature increase of the target battery may be acceptable, for example, the purpose may be prevention of freezing of the target battery. The first temperature may be equal to or different from the second temperature. For example, the second temperature may be lower than the first temperature.

When the temperature of the target battery is lower than the first temperature, the controller may transmit to outside of the electrically powered vehicle, information indicating electric power that can be output from the target battery while the temperature of the target battery is equal to or higher than the first temperature. According to such a configuration, the electrically powered vehicle more readily participates in power leveling.

The controller may determine whether or not to perform the temperature increase control and which of external electric power and battery power is to be selected in the temperature increase control, based on timing to start the external power feed indicated by the leveling signal that requests for the external power feed, current time, and the temperature of the target battery.

According to the configuration, timing of the temperature increase control of the target battery and electric power to be used for the temperature increase control of the target battery (external electric power/battery power) are more readily appropriately determined. The controller may include a storage that stores information (for example, a map) that represents relation among timing of start of external power feed, current time, the temperature of the target battery, and contents of the temperature increase control (for example, any of not increasing a temperature, increasing a temperature with external electric power, and increasing a temperature with battery power).

When a state of charge (SOC) of the target battery is lower than a prescribed SOC value, the controller may not allow the target battery to discharge. According to such a configuration, overdischarging of the target battery (and accelerated deterioration of the target battery) is suppressed. An SOC represents a remaining amount of stored power, and it expresses, for example, a ratio of a current amount of stored power to an amount of stored power in a fully charged state that ranges from 0 to 100%.

The foregoing and other objects, features, aspects and advantages of the present disclosure will become more apparent from the following detailed description of the present disclosure when taken in conjunction with the accompanying drawings.

DETAILED DESCRIPTION

Figure 1:
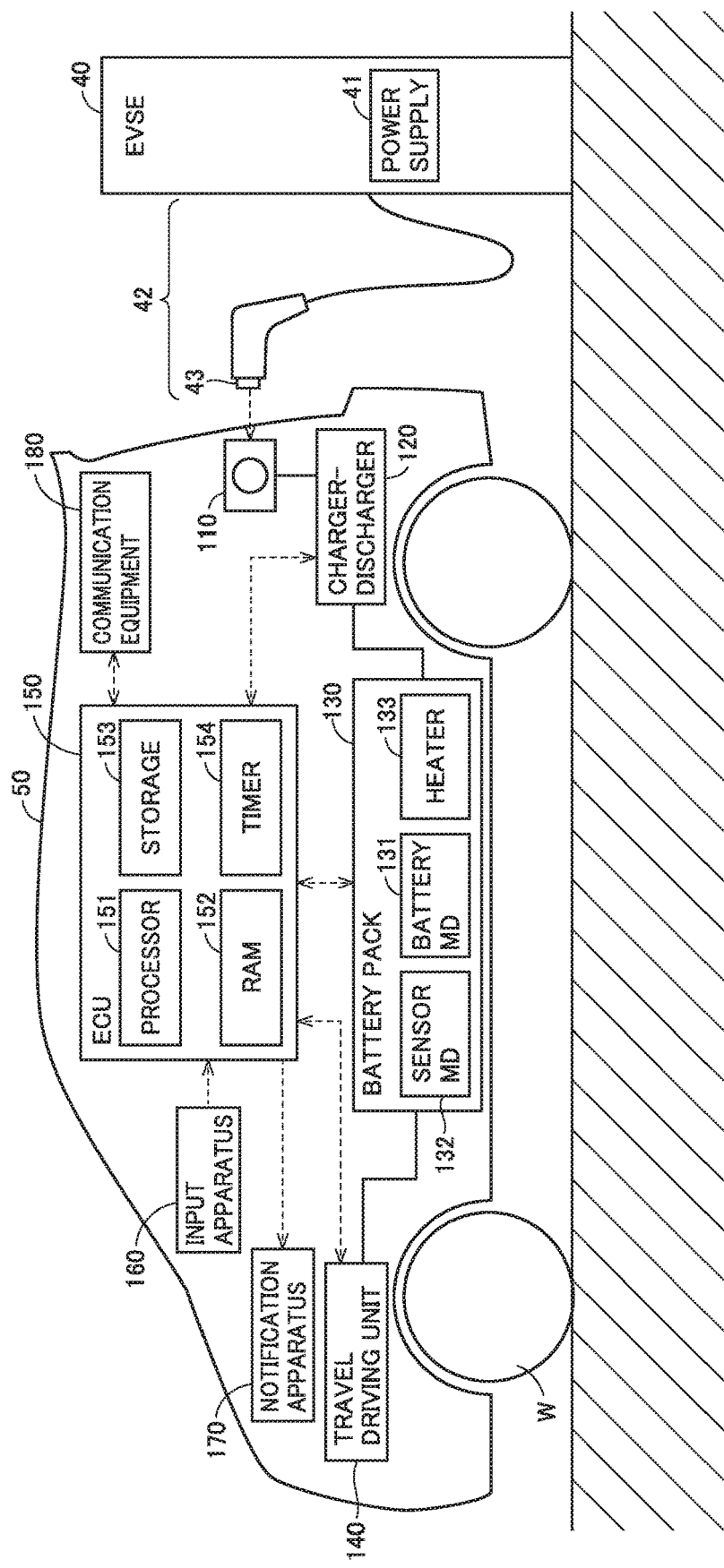
FIG. 1 is a diagram showing a configuration of an electrically powered vehicle according to an embodiment of the present disclosure.

An embodiment of the present disclosure will be described below in detail with reference to the drawings. The same or corresponding elements in the drawings have the same reference characters allotted and description thereof will not be repeated.

FIG. 1 is a diagram showing a configuration of an electrically powered vehicle according to this embodiment. Referring to FIG. 1, a vehicle 50 includes an inlet 110, a charger-discharger 120, a battery pack 130, a travel driving unit 140, an electronic control unit (which is denoted as an "ECU" below) 150, an input apparatus 160, a notification apparatus 170, communication equipment 180, and a drive wheel W. Battery pack 130 includes a battery module (which is denoted as a "battery MD" below) 131, a sensor module (which is denoted as a "sensor MD" below) 132, and a heater 133.

Figure 2:
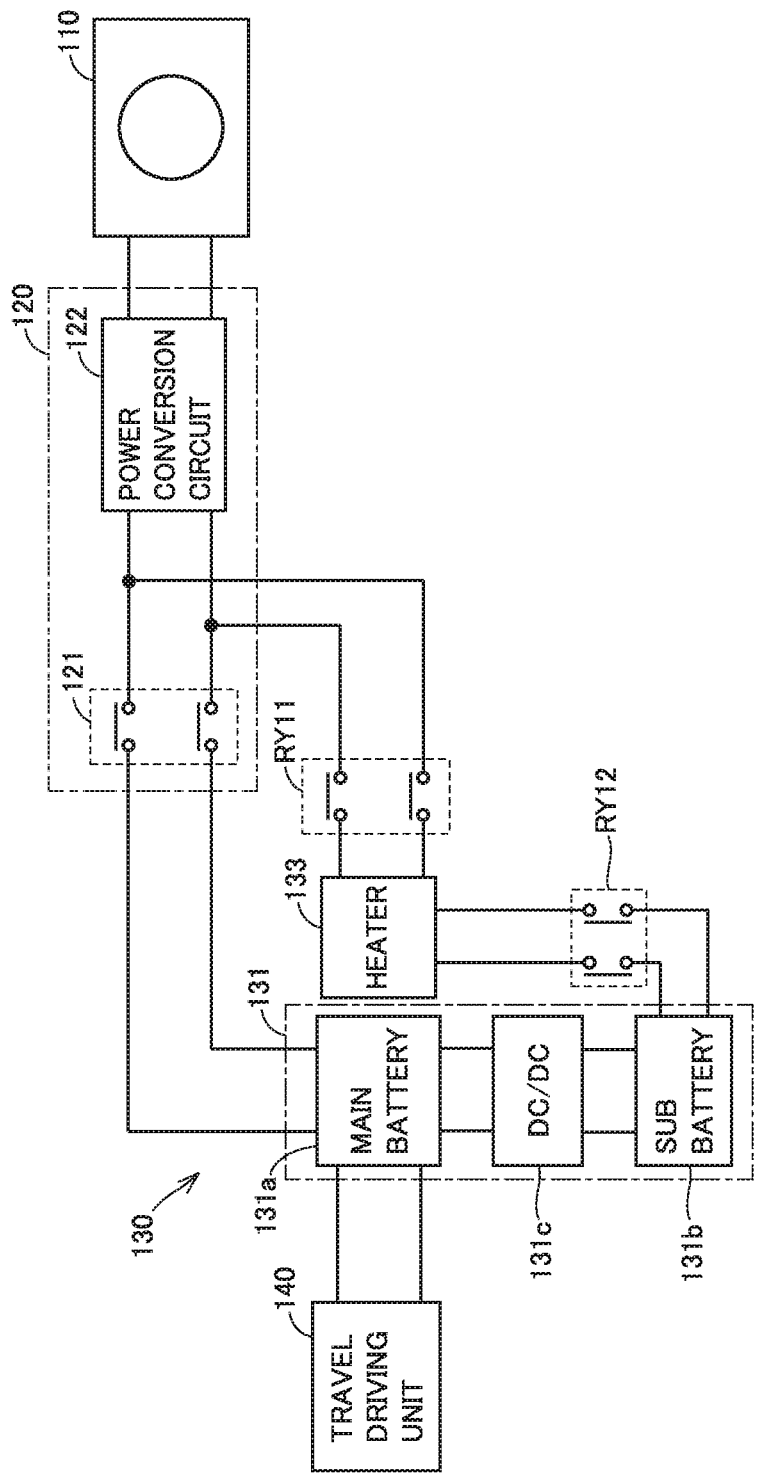
FIG. 2 is a diagram showing a detailed configuration of a charger-discharger and a battery pack shown in FIG. 1.

FIG. 2 is a diagram showing a detailed configuration of charger-discharger 120 and battery pack 130. Referring to FIG. 2, battery MD 131 includes a main battery 131a that stores electric power for traveling, a sub battery 131b that supplies electric power to auxiliary machinery mounted on vehicle 50, and a DC/DC converter 131c. Main battery 131a is implemented by a secondary battery such as a lithium ion battery or a nickel metal hydride battery. Main battery 131a may be implemented by a battery assembly. Sub battery 131b is implemented by a secondary battery such as a lead-acid battery or a nickel metal hydride battery. Sub battery 131b is lower in capacity than main battery 131a. DC/DC converter 131c converts (for example, down-converts) electric power supplied from main battery 131a into direct-current (DC) power suitable for charging of sub battery 131b and outputs DC power to sub battery 131b. DC/DC converter 131c is controlled by ECU 150 (FIG. 1).

Though not shown in FIG. 2, sensor MD 132 (FIG. 1) monitors a state of each of main battery 131a and sub battery 131b. Sensor MD 132 includes various sensors that detect a state (for example, a temperature, a current, and a voltage) of each of main battery 131a and sub battery 131b and outputs a result of detection to ECU 150 (FIG. 1). ECU 150 can obtain the state (for example, a temperature, a current, a voltage, an SOC, and an internal resistance) of each of main battery 131a and sub battery 131b based on an output from sensor MD 132 (that is, detection values from the various sensors).

Heater 133 heats main battery 131a with electricity. Battery pack 130 further includes relays RY11 and RY12. Relay RY11 switches between connection and disconnection of an electric power path from charger-discharger 120 to heater 133. Relay RY12 switches between connection and disconnection of an electric power path from sub battery 131b to heater 133. While relay RY11 is closed (connected), heater 133 can heat main battery 131a with electric power supplied from the outside of the vehicle (that is, external electric power). While relay RY12 is closed (connected), heater 133 can heat main battery 131a with electric power supplied from sub battery 131b (that is, battery power). Each of relay RY11, relay RY12, and heater 133 is controlled by ECU 150 (FIG. 1). When heater 133 is to be driven, ECU 150 has any one of relays RY11 and RY12 closed (connected). While heater 133 is in an off state (OFF), both of relays RY11 and RY12 are opened (disconnected). Heater 133 according to this embodiment corresponds to an exemplary "electric heater" according to the present disclosure.

Charger-discharger 120 is located between inlet 110 and main battery 131a. Charger-discharger 120 includes a relay 121 and a power conversion circuit 122. Relay 121 switches between connection and disconnection of an electric power path from inlet 110 to main battery 131a. For example, a bidirectional converter can be adopted as power conversion circuit 122. Each of relay 121 and power conversion circuit 122 can be controlled by ECU 150 (FIG. 1).

The configuration of charger-discharger 120 is not limited as above and can be modified as appropriate. Charger-discharger 120 may include, for example, at least one of a rectification circuit, a power factor correction circuit, an insulating circuit (for example, an insulating transformer), an inverter, and a filter circuit.

Referring to FIGS. 1 and 2, vehicle 50 includes inlet 110 and charger-discharger 120 adapted to a power feed type of electric vehicle supply equipment (EVSE) 40. Vehicle 50 can charge main battery 131a by receiving supply of electric power from EVSE 40. Though FIG. 1 shows only inlet 110 and charger-discharger 120, vehicle 50 may include an inlet and a charger-discharger for each power feed type so as to adapt to a plurality of power feed types (for example, an alternating-current (AC) type and a DC type).

EVSE 40 includes a power supply 41 (that is, a power supply outside the vehicle). A charging cable 42 is connected to EVSE 40. Charging cable 42 may always be connected to EVSE 40 or may be attachable to and removable from EVSE 40. EVSE 40 may be a receptacle type charging facility. Charging cable 42 includes a connector 43 at its tip end and contains a power line. Inlet 110 receives electric power supplied from the outside of vehicle 50. Connector 43 of charging cable 42 can be connected to inlet 110. As connector 43 of charging cable 42 connected to EVSE 40 is connected to inlet 110 of vehicle 50, EVSE 40 and vehicle 50 are electrically connected to each other. Electric power can thus be supplied from EVSE 40 through charging cable 42 to vehicle 50.

As EVSE 40 outside vehicle 50 and inlet 110 are connected to each other through charging cable 42, electric power can be supplied and received between EVSE 40 and vehicle 50. For example, electric power can be supplied from the outside of vehicle 50 to charge main battery 131a of vehicle 50 (that is, external charging can be carried out). Electric power for external charging is supplied, for example, from EVSE 40 through charging cable 42 to inlet 110. Power conversion circuit 122 of charger-discharger 120 converts electric power received at inlet 110 into electric power suitable for charging of main battery 131a and outputs resultant electric power to main battery 131a. As EVSE 40 and inlet 110 are connected to each other through charging cable 42, electric power can be fed from vehicle 50 (and main battery 131a can be discharged) through charging cable 42 to EVSE 40. Electric power for external power feed (that is, electric power for power feed to the outside of vehicle 50) is supplied from main battery 131a to charger-discharger 120. Power conversion circuit 122 of charger-discharger 120 converts electric power supplied from main battery 131a into electric power suitable for external power feed (for example, DC/AC conversion) and outputs resultant electric power (for example, AC power) to inlet 110. When any of external charging and external power feed is performed, relay 121 of charger-discharger 120 is closed (connected), and when neither of external charging and external power feed is performed, relay 121 of charger-discharger 120 is opened (disconnected).

Travel driving unit 140 includes a not-shown power control unit (PCU) and a motor generator (MG), and allows vehicle 50 to travel with electric power stored in main battery 131a. The PCU includes, for example, a controller including a processor, an inverter, a converter, and a relay (which is referred to as a "system main relay (SMR)" below) (none of which is shown). The controller of the PCU receives an instruction (a control signal) from ECU 150 and controls the inverter, the converter, and the SMR of the PCU in accordance with the instruction. The MG is implemented, for example, by a three-phase AC motor generator. The MG is driven by the PCU and rotates drive wheel W. The MG performs regeneration and supplies regenerated electric power to main battery 131a. The SMR switches between connection and disconnection of an electric power path from main battery 131a to the PCU. The SMR is closed (connected) when vehicle 50 travels. Vehicle 50 is not limited to a front-wheel-drive vehicle shown in FIG. 1 and it may be a rear-wheel-drive vehicle or a four-wheel-drive vehicle.

Vehicle 50 may be an electric vehicle (EV) that can travel only with electric power stored in main battery 131a or a plug-in hybrid vehicle (PHV) that can travel with both of electric power stored in main battery 131a and output from an engine (not shown). Vehicle 50, main battery 131a, and sub battery 131b according to this embodiment correspond to an exemplary "electrically powered vehicle," an exemplary "target battery," and an exemplary "battery other than the target battery" according to the present disclosure, respectively.

Referring to FIG. 1, ECU 150 includes a processor 151, a random access memory (RAM) 152, a storage 153, and a timer 154. For example, a central processing unit (CPU) can be adopted as processor 151. RAM 152 functions as a work memory that temporarily stores data to be processed by processor 151. Storage 153 can store information that is put thereinto. Storage 153 includes, for example, a read only memory (ROM) and a rewritable non-volatile memory. Storage 153 stores not only a program but also information (for example, a map, a mathematical expression, and various parameters) to be used by a program. As a program stored in storage 153 is executed by processor 151, various types of control by ECU 150 are carried out in this embodiment. Various types of control by ECU 150 are not limited to control carried out by software but can be carried out also by dedicated hardware (electronic circuitry). Any number of processors may be provided in ECU 150 and a processor may be prepared for each prescribed type of control.

Timer 154 notifies processor 151 that the set time has come. As the time set in timer 154 comes, timer 154 transmits a signal to that effect to processor 151. In this embodiment, a timer circuit is adopted as timer 154. Timer 154 may be implemented by software instead of hardware (timer circuitry).

ECU 150 controls charging and discharging of main battery 131a. ECU 150 restricts electric power input to main battery 131a to electric power at a prescribed first threshold value (which is denoted as "Win" below) or lower. By controlling charger-discharger 120 and travel driving unit 140, ECU 150 prevents electric power exceeding Win from being input to main battery 131a. ECU 150 restricts electric power output from main battery 131a to electric power at a prescribed second threshold value (which is denoted as "Wout" below) or lower. By controlling charger-discharger 120 and travel driving unit 140, ECU 150 prevents electric power exceeding Wout from being output from main battery 131a. Win and Wout are set, for example, for the purpose of protection of main battery 131a. Win represents electric power that can be input to main battery 131a (that is, a maximum value of input electric power) and Wout represents electric power that can be output from main battery 131a (that is, a maximum value of output electric power).

ECU 150 variably sets Wout. Information representing relation between at least one parameter including at least a temperature of main battery 131a and Wout (which is referred to as a "Wout map" below) is stored in storage 153. ECU 150 sets Wout based on the Wout map. Wout is varied depending on a temperature of main battery 131a. In this embodiment, the Wout map shows such relation that Wout is smaller as a temperature of main battery 131a is lower in a range of normal use of main battery 131a (for example, a temperature range including a first temperature which will be described later). Examples of the parameter other than the temperature of main battery 131a in the Wout map include an SOC of main battery 131a. ECU 150 may variably set Win with an approach similarly to that for Wout.

ECU 150 controls charging and discharging of sub battery 131b. ECU 150 may also restrict electric power input to and output from sub battery 131b with the approach the same as above.

Input apparatus 160 accepts an input from a user. Input apparatus 160 is operated by a user and outputs a signal corresponding to the operation by the user to ECU 150. Communication may be wired or wireless. Examples of input apparatus 160 include various switches, various pointing devices, a keyboard, and a touch panel. An operation portion of a car navigation system may be adopted as input apparatus 160.

Notification apparatus 170 performs prescribed processing for giving a notification to a user (for example, a driver and/or a passenger of vehicle 50) when a request is given from ECU 150. Notification apparatus 170 may include at least one of a display apparatus (for example, a touch panel display), a speaker (for example, a smart speaker), and a lamp (for example, a malfunction indicator lamp (MIL)). Notification apparatus 170 may be implemented by a meter panel, a head-up display, or a car navigation system.

Communication equipment 180 includes various communication interfaces (I/F). ECU 150 wirelessly communicates with a communication apparatus outside vehicle 50 through communication equipment 180.

In a vehicle grid integration (VGI) system according to this embodiment, an electrically powered vehicle (that is, vehicle 50 described above) including a battery is adopted as DSR for realizing a virtual power plant (VPP).

Figure 3:
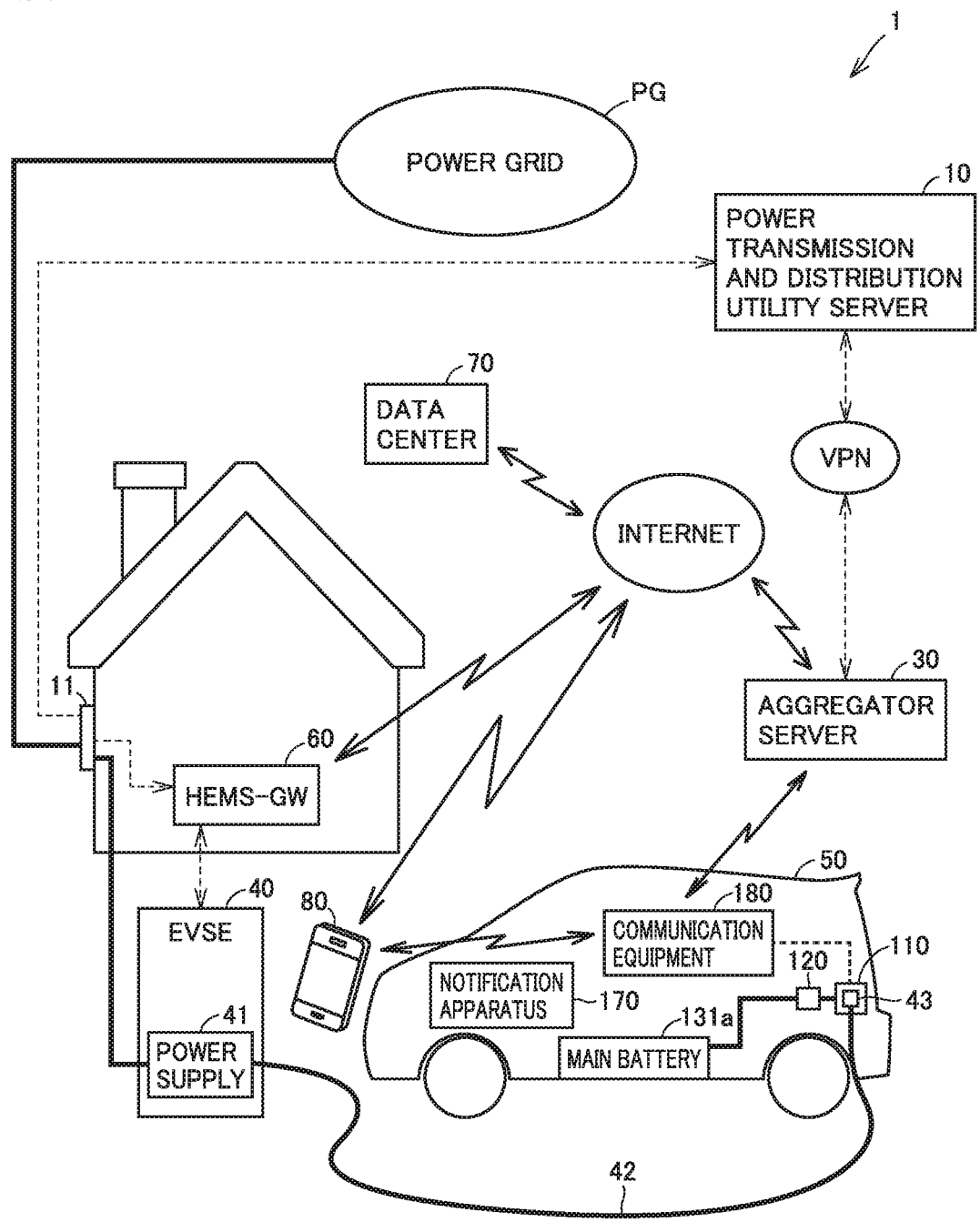
FIG. 3 is a diagram showing a configuration of an electric power system including the electrically powered vehicle according to the embodiment of the present disclosure.

FIG. 3 is a diagram showing a configuration of an electric power system including the electrically powered vehicle according to this embodiment. A VGI system 1 shown in FIG. 3 corresponds to an exemplary electric power system. Though FIG. 3 shows only one of each of the vehicle, the EVSE, and an aggregator server, VGI system 1 includes a plurality of vehicles, a plurality of pieces of EVSE, and a plurality of aggregator servers. Any independent number of vehicles, pieces of EVSE, and aggregator servers may be included in VGI system 1, and the number may be set to ten or more or one hundred or more. Each vehicle included in VGI system 1 may be a personally owned vehicle (POV) or a vehicle managed by a mobility as a service (MaaS) entity (MaaS vehicle). Though FIG. 3 shows only a single portable terminal, the portable terminal is carried by each user of the vehicle. Though FIG. 3 illustrates home EVSE, VGI system 1 may include public EVSE.

Referring to FIG. 3, VGI system 1 includes a power transmission and distribution utility server 10 (which is also simply referred to as a "server 10" below), a smart meter 11, an aggregator server 30 (which is also simply referred to as a "server 30" below), EVSE 40, vehicle 50 (see FIG. 1), a home energy management system-gateway (HEMS-GW) 60, a data center 70, a portable terminal 80, and a power grid PG. In this embodiment, a smartphone equipped with a touch panel display is adopted as portable terminal 80. Without being limited thereto, any portable terminal can be adopted as portable terminal 80, and for example, a tablet terminal, a portable game console, and a wearable device such as a smart watch can also be adopted.

Server 10 belongs to a power transmission and distribution utility. In this embodiment, an electric power utility company serves also as a power generation utility and a power transmission and distribution utility. The electric power utility company constructs power grid PG (a power network) with a power plant and a power transmission and distribution facility which are not shown, and maintains and manages server 10, smart meter 11, EVSE 40, HEMS-GW 60, and power grid PG. In this embodiment, the electric power utility company corresponds to a system operator that operates power grid PG. The electric power utility company can make a profit, for example, by dealing with a demand side (for example, an individual or a company) that uses electric power. The electric power utility company provides each demand side with a smart meter. For example, a user of vehicle 50 is provided with smart meter 11. Identification information (which is also referred to as a "meter ID" below) for identification of each smart meter is provided for each smart meter, and server 10 manages a value of measurement by each smart meter as being distinguished based on the meter ID. The electric power utility company can know an amount of power usage for each demand side based on a value of measurement by each smart meter.

In VGI system 1, identification information (ID) for identification among a plurality of aggregators is provided for each aggregator. Server 10 manages information for each aggregator as being distinguished based on the ID of the aggregator. The aggregator provides an energy management service by putting together amounts of electric power controlled by demand sides under the control thereof. The aggregator controls the amount of electric power by requesting each demand side to level electric power by using a DR signal.

Server 30 belongs to an aggregator. Server 30 includes a processor and a storage (not shown). In VGI system 1, an electrically powered vehicle (for example, a POV or a MaaS vehicle) is adopted as DSR managed by the aggregator (and server 30). A demand side controls an amount of electric power by means of the electrically powered vehicle. Identification information for identification of each electrically powered vehicle included in VGI system 1 (which is also referred to as a "vehicle ID" below) is provided for each electrically powered vehicle. Server 30 manages information for each electrically powered vehicle as being distinguished based on the vehicle ID. The aggregator may procure capacity (capability of supply of electricity) not only from the electrically powered vehicle but also from a resource other than the electrically powered vehicle (for example, biomass). The aggregator can make a profit, for example, by dealing with an electric power utility company. The aggregator may be divided into an upper aggregator that contacts the power transmission and distribution utility (for example, the electric power utility company) and a lower aggregator that contacts a demand side.

Data center 70 includes, for example, a server (not shown) that manages information. Data center 70 manages information on a plurality of registered portable terminals (including portable terminals 80). Information on the portable terminal includes not only information on the terminal itself (for example, a communication address of the portable terminal) but also information on a user who carries the portable terminal (for example, a vehicle ID of the electrically powered vehicle belonging to the user). Identification information for identification of the portable terminal (which is also referred to as a "terminal ID" below) is provided for each portable terminal and data center 70 manages information for each portable terminal as being distinguished based on the terminal ID. The terminal ID also functions as information for identification of a user (a user ID).

Prescribed application software (which is simply referred to as an "application" below) is installed in portable terminal 80, and portable terminal 80 exchanges information with each of HEMS-GW 60 and data center 70 through the application. Portable terminal 80 wirelessly communicates with each of HEMS-GW 60 and data center 70, for example, through the Internet. A user can transmit information representing a state and a schedule of the user to data center 70 by operating portable terminal 80. Exemplary information representing a state of the user includes information indicating whether or not the user is in a condition of being ready for addressing DR. Exemplary information representing the schedule of the user includes time of departure of a POV from home or a drive plan of a MaaS vehicle. Data center 70 stores the information received from portable terminal 80 as being distinguished for each terminal ID.

Server 10 and server 30 can communicate with each other, for example, through a virtual private network (VPN). Server 30 and data center 70 can communicate with each other, for example, through the Internet. Server 30 can obtain information on a user from data center 70. Each of server 30 and data center 70 can communicate with HEMS-GW 60, for example, through the Internet. Though server 30 and EVSE 40 do not communicate with each other in this embodiment, server 30 and EVSE 40 may communicate with each other.

Server 10 levels electric power by using demand response (DR). When server 10 levels electric power, initially, the server transmits a signal (which is also referred to as a "DR participation request" below) requesting participation into DR to each aggregator server (including server 30). The DR participation request includes a region of interest of DR, a type of DR (for example, DR suppression or DR increase), and a DR period. When server 30 receives a DR participation request from server 10, it calculates an adjustable DR amount (that is, an amount of electric power that can be adjusted in accordance with DR) and transmits the amount to server 10. Server 30 can calculate the adjustable DR amount, for example, based on a total of DR capacities (that is, capacities for DR) of demand sides under the control thereof.

Server 10 determines a DR amount (that is, an amount of power adjustment asked to an aggregator) for each aggregator based on the adjustable DR amount received from each aggregator server and transmits a signal (which is also referred to as a "DR execution instruction" below) instructing each aggregator server (including server 30) to execute DR. The DR execution instruction includes a region of interest of DR, a type of DR (for example, DR suppression or DR increase), a DR amount for the aggregator, and a DR period. When server 30 receives the DR execution instruction, it allocates the DR amount to each electrically powered vehicle that can address DR among the electrically powered vehicles under the control thereof, generates a DR signal for each electrically powered vehicle, and transmits the DR signal to each electrically powered vehicle. The DR signal includes a type of DR (for example, DR suppression or DR increase), a DR amount for the electrically powered vehicle, and a DR period.

ECU 150 receives a DR signal through communication equipment 180 from the outside of the vehicle. When ECU 150 receives the DR signal, a user of vehicle 50 can contribute to power leveling by carrying out charging or discharging in accordance with the DR signal by using EVSE 40 and vehicle 50. When the user of vehicle 50 has contributed to power leveling, an incentive in accordance with contribution may be paid to the user of vehicle 50 by an electric utility (for example, an electric power utility company or an aggregator) based on an agreement between the user of vehicle 50 and the electric utility.

Figure 4:
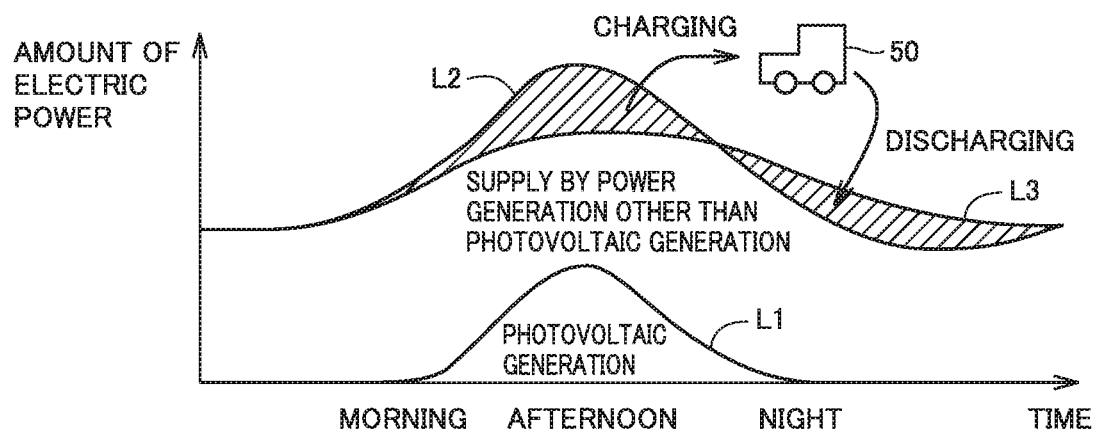
FIG. 4 is a diagram showing exemplary relation between an amount of supply of electric power and an amount of demand for electric power in the electric power system shown in FIG. 3.

FIG. 4 is a diagram showing exemplary relation between an amount of supply of electric power and an amount of demand for electric power in VGI system 1. In FIG. 4, a line L1 represents an amount of electric power supplied by photovoltaic generation (which is also referred to as a "PV amount" below). A line L2 represents a total amount of supply of electric power (that is, a total of an amount of electric power supplied by power generation other than photovoltaic generation and the PV amount). The total amount of supply of electric power corresponds to an amount of electric power that can be supplied by power grid PG. A line L3 represents an amount of power demand.

Referring to FIG. 4, since the PV amount is dependent on an amount of solar radiation, the total amount of supply of electric power is large in the daytime. When the total amount of supply of electric power (line L2) is larger than the amount of power demand (line L3), a user of vehicle 50 can contribute to power leveling by storing electric power supplied from power grid PG in battery MD 131 (FIG. 1). When the total amount of supply of electric power (line L2) is smaller than the amount of power demand (line L3), the user of vehicle 50 can contribute to power leveling by supplying electric power to power grid PG by discharging of battery MD 131 (FIG. 1).

Referring again to FIG. 3, vehicle 50 is electrically connected to outdoor EVSE 40 through charging cable 42 while it is parked in a parking space of a residence (for example, a user's house). EVSE 40 is a non-public charging facility used only by a user and a family member of the user. As connector 43 of charging cable 42 connected to EVSE 40 is connected to inlet 110 of vehicle 50, vehicle 50 and EVSE 40 can communicate with each other and electric power can be supplied from power supply 41 included in EVSE 40 to vehicle 50 (and main battery 131*a*). Power supply 41 is connected to power grid PG provided by the electric power utility company with smart meter 11 being interposed. Power supply 41 supplies electric power supplied from power grid PG to vehicle 50 through charging cable 42.

HEMS-GW 60 transmits information on energy management (for example, information representing a state of use of electric power) to each of server 30, data center 70, and portable terminal 80. HEMS-GW 60 receives a value of measurement of the amount of electric power from smart meter 11. Smart meter 11 and HEMS-GW 60 may communicate with each other in any type of communication, and the type of communication may be a 920-MHz-band low-power wireless communication or power line communication (PLC). HEMS-GW 60 and EVSE 40 can communicate with each other, for example, through a local area network (LAN). The LAN may be wired or wireless LAN.

Communication equipment 180 mounted on vehicle 50 communicates with EVSE 40 through charging cable 42. Communication between EVSE 40 and vehicle 50 may be of any type, and for example, controller area network (CAN) or PLC may be adopted. Communication equipment 180 wirelessly communicates with server 30, for example, through a mobile communication network (telematics). In this embodiment, communication equipment 180 and portable terminal 80 wirelessly communicate with each other. Communication equipment 180 and portable terminal 80 may communicate with each other through short-range communication (for example, direct communication in a vehicle or within an area around the vehicle).

Smart meter 11 measures an amount of power usage each time a prescribed time period elapses (for example, each time thirty minutes elapse), stores the measured amount of power usage, and transmits the measured amount of power usage to each of server 10 and HEMS-GW 60. For example, IEC (DLMS/COSEM) can be adopted as a protocol for communication between smart meter 11 and server 10. Server 10 transmits at any time, a value of measurement by smart meter 11 to server 30. Server 10 may transmit the measurement value regularly or upon request from server 30.

EVSE 40 is connected to power grid PG with smart meter 11 being interposed. Smart meter 11 measures an amount of electric power supplied from EVSE 40 to vehicle 50. EVSE 40 may be a charging facility adapted to backfeeding (that is, a charging and discharging facility). Smart meter 11 may measure an amount of electric power backfed from vehicle 50 to EVSE 40.

Vehicle 50 includes externally chargeable and externally power-feedable main battery 131*a* (FIG. 2). Main battery 131*a*, however, may not exhibit sufficient output performance in a low-temperature state. ECU 150 in this embodiment performs temperature increase control of main battery 131*a* to increase a temperature of main battery 131*a* to a prescribed temperature or higher before carrying out external power feed. In this embodiment, the temperature increase control carried out by ECU 150 is control for increasing a temperature of main battery 131*a* by selecting any one of external electric power supplied from the outside of the vehicle and battery power stored in a vehicle-mounted battery (for example, main battery 131*a* or sub battery 131*b*) and generating heat with the selected electric power. In this embodiment, in the temperature increase control, ECU 150 drives heater 133 (FIG. 2) by supply of the selected electric power to heater 133 to thereby generate heat for temperature increase of main battery 131*a*.

While vehicle 50 is requested to carry out external power feed by a DR suppression signal, it is estimated that an energy resource is insufficient. Then, when a temperature of main battery 131*a* is lower than a prescribed first temperature in carrying out external power feed requested by the DR suppression signal, ECU 150 in this embodiment performs temperature increase control as described above by using battery power (for example, electric power stored in sub battery 131*b* shown in FIG. 2) before carrying out external power feed. ECU 150 according to this embodiment corresponds to an exemplary "controller" according to the present disclosure.

Figure 5:
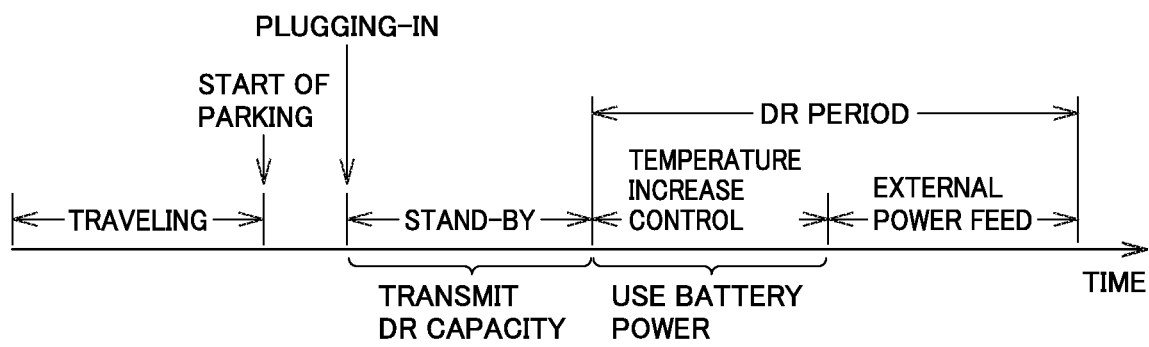
FIG. 5 is a diagram for illustrating an exemplary operation by the electrically powered vehicle according to the embodiment of the present disclosure.

FIG. 5 is a diagram for illustrating an exemplary operation by the electrically powered vehicle (vehicle 50) according to this embodiment. Referring to FIG. 5 together with FIG. 3, when vehicle 50 finishes travel, the vehicle returns to a user's house and is parked in a parking space in the house. When the user connects (plugs in) connector 43 of charging cable 42 connected to EVSE 40 to inlet 110 of vehicle 50 while vehicle 50 is parked, preparation for charging of vehicle 50 is completed. Vehicle 50 stands by in this state. Vehicle 50 in the stand-by state transmits to server 30 at any time, information indicating electric power that can be output from vehicle 50 in external power feed (which is also referred to as "power feed capability information" below). The power feed capability information corresponds to exemplary information representing a DR capacity. Vehicle 50 may transmit power feed capability information regularly or upon request from server 30. When the temperature of main battery 131a is lower than the first temperature, ECU 150 in this embodiment transmits to server 30 as power feed capability information, information indicating electric power that can be output from main battery 131a while a temperature of main battery 131a is equal to or higher than the first temperature. The electric power that can be output from main battery 131a is referred to as "power output capability of main battery 131a" below. In this embodiment, the power output capability of main battery 131a is a maximum value of output electric power indicated by Wout.

In vehicle 50 according to this embodiment, when the temperature of main battery 131a is lower than the first temperature, temperature increase control of main battery 131a is performed before external power feed requested by the DR signal is carried out. When external power feed is carried out, the temperature of main battery 131a is equal to or higher than the first temperature. When information indicating power output capability of main battery 131a while the temperature of main battery 131a is lower than the first temperature (that is, output performance of main battery 131a before temperature increase) is transmitted to server 30 (aggregator server), the aggregator is informed of electric power lower than power output capability of main battery 131a at the time when external power feed is carried out (that is, main battery 131a increased in temperature). In selecting an electrically powered vehicle of which participation in DR is to be requested, the aggregator may take into account output performance of the battery of the electrically powered vehicle, and is more likely to select an electrically powered vehicle higher in output performance of the battery. In this regard, according to ECU 150, information representing output performance of main battery 131a increased in temperature can be transmitted to server 30. Thus, as compared with an example where information representing output performance of main battery 131a before temperature increase is transmitted to server 30, vehicle 50 is more likely to be selected by the aggregator.

Vehicle 50 in the stand-by state is parked in the externally chargeable and externally power-feedable state (see FIG. 3). When the current time is within a DR period (that is, a period during which a DR signal requests for external power feed) while vehicle 50 stands by, ECU 150 carries out external power feed. When the temperature of main battery 131a is lower than the first temperature, however, ECU 150 performs the temperature increase control as described previously to increase the temperature of main battery 131a to the first temperature or higher by using battery power before carrying out external power feed. After the temperature of main battery 131a is equal to or higher than the first temperature, ECU 150 allows main battery 131a to discharge to carry out external power feed. A DR signal by which external power feed is requested is referred to as a "target DR signal" below.

DR start timing is indicated by a DR period included in a DR signal. The DR period indicates DR start timing and DR end timing. DR start timing may be time of transmission of the DR signal (that is, immediate start). The DR period included in the target DR signal indicates a period during which the target DR signal requests for external power feed (that is, timing of start and end of external power feed). The target DR signal includes a target DR signal that requests for immediate start of external power feed and a target DR signal that designates timing of start of external power feed that is not immediately started. When the target DR signal received by vehicle 50 is the latter target DR signal, vehicle 50 does not immediately start external power feed even though it receives the target DR signal, and vehicle 50 starts external power feed when timing of start of external power feed indicated by the target DR signal comes.

Figure 6:
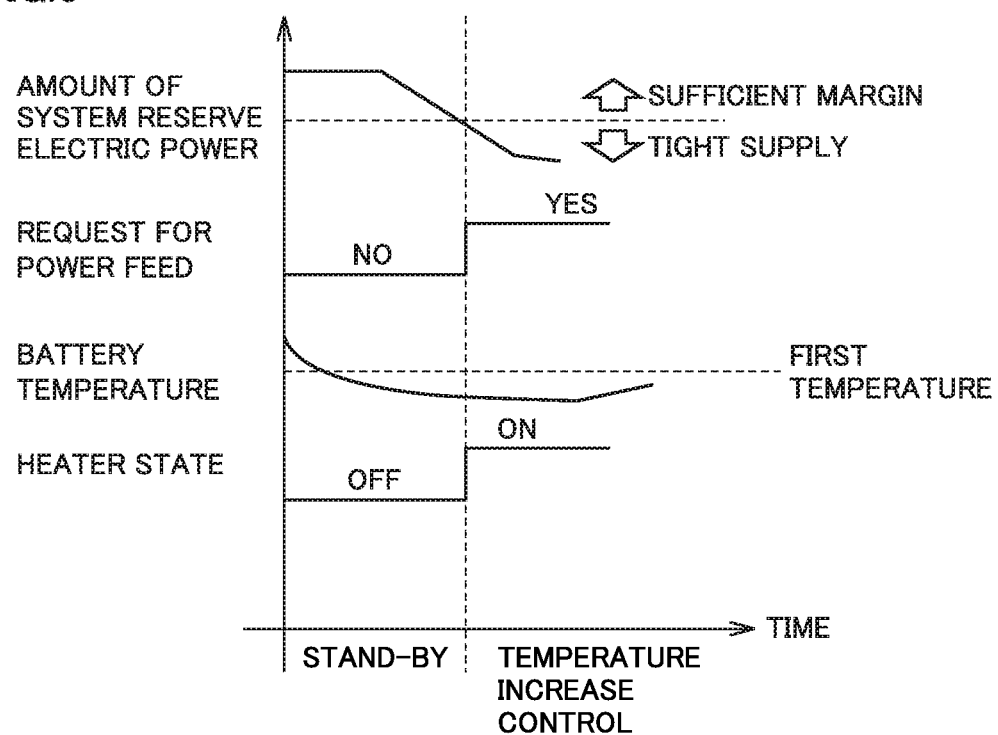
FIG. 6 is a diagram showing an exemplary situation in which the electrically powered vehicle according to the embodiment of the present disclosure is requested to carry out external power feed by a DR signal.

FIG. 6 is a diagram showing an exemplary situation in which vehicle 50 in the stand-by state is requested to carry out external power feed by a DR signal. Referring to FIG. 6 together with FIG. 3, vehicle 50 stands by with heater 133 being in the off state (OFF). Therefore, while vehicle 50 stands by, the temperature of main battery 131a (battery temperature) is lowered. When an amount of electric power that can be supplied by power grid PG (an amount of system reserve electric power) becomes small, a target DR signal (for example, a target DR signal that requests for immediate start of DR) is transmitted from server 30 to vehicle 50. In the example shown in FIG. 6, when vehicle 50 receives this target DR signal, the temperature of main battery 131a is lower than the first temperature. Therefore, ECU 150 drives heater 133 by having relay RY12 shown in FIG. 2 closed (connected) to supply electric power of sub battery 131b (battery power) to heater 133 (FIG. 2). Some time after heater 133 is activated (ON), heat of heater 133 conducts to main battery 131a and the temperature of main battery 131a increases. Then, ECU 150 carries out external power feed in accordance with the DR signal after the temperature of main battery 131a is equal to or higher than the first temperature.

Figure 7:
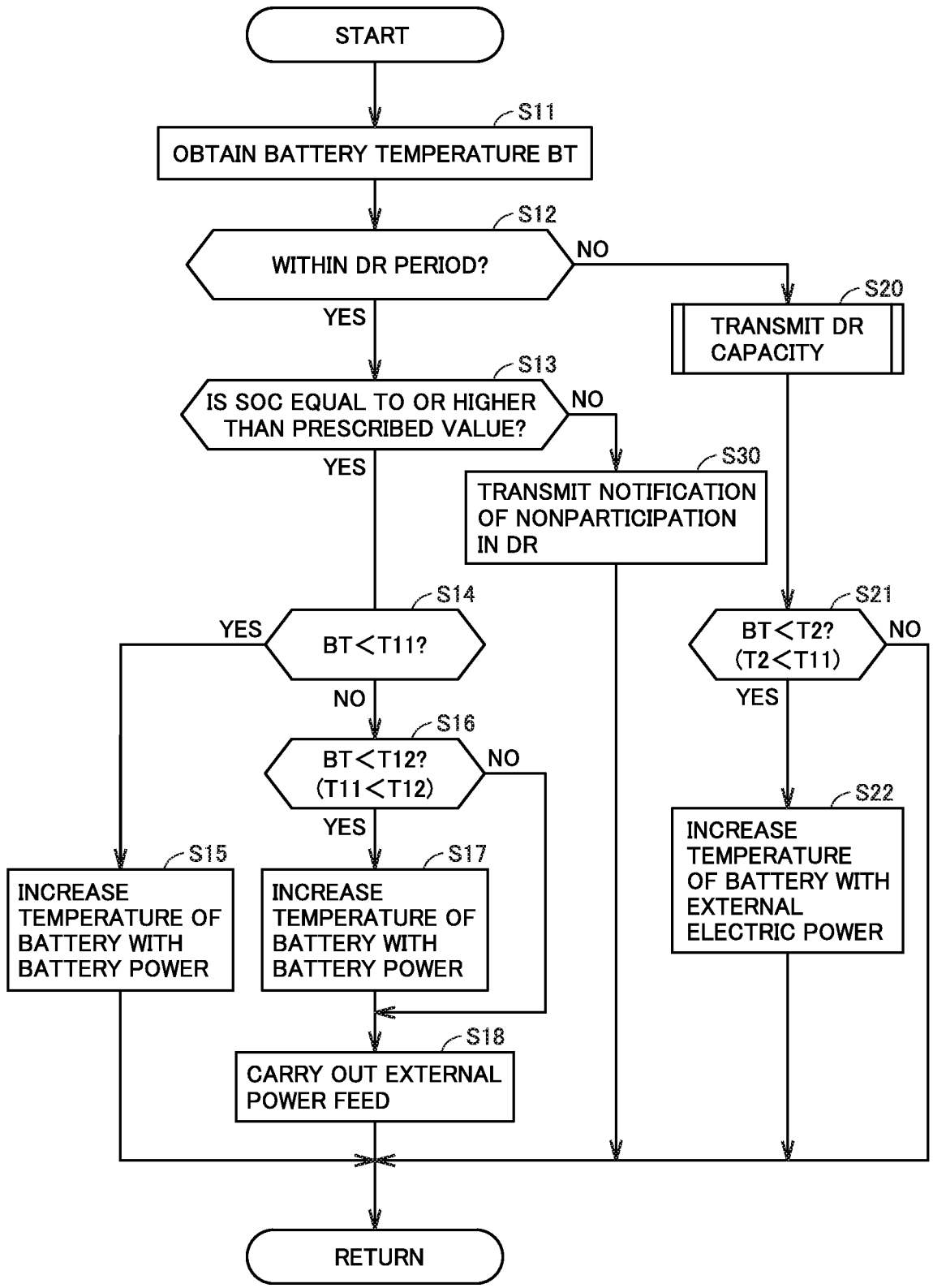
FIG. 7 is a flowchart showing processing involved with temperature increase of a battery and external power feed performed by a controller of the electrically powered vehicle according to the embodiment of the present disclosure.

FIG. 7 is a flowchart showing processing involved with temperature increase of the battery and external power feed performed by ECU 150. Processing shown in this flowchart is repeatedly performed while vehicle 50 is parked in the externally chargeable and externally power-feedable state (for example, in the stand-by state described previously).

Referring to FIG. 7 together with FIGS. 1 to 3, in step (which is simply denoted as "S" below) 11, ECU 150 obtains a temperature of main battery 131a (which is denoted as a "BT" below). ECU 150 can obtain a BT based on an output from a temperature sensor (more specifically, a temperature sensor that detects a temperature of main battery 131a) included in sensor MD 132.

In S12, ECU 150 determines whether or not the current time is within a DR period. The DR period is indicated by the target DR signal. For example, when vehicle 50 receives the target DR signal that requests for immediate start of external power feed, determination as YES is made in S12 and the process proceeds to S13.

In S13, ECU 150 determines whether or not an SOC of main battery 131a (which is also referred to as a "main SOC" below) is equal to or higher than a prescribed SOC value. ECU 150 can obtain the main SOC based on an output from sensor MD 132. Various known approaches such as an approach by accumulation of current values (coulomb counting) or an approach by estimation of an SOC based on relation between an open circuit voltage (OCV) and the SOC can be adopted as a method of measuring an SOC.

When the main SOC is lower than the prescribed SOC value (NO in S13), ECU 150 transmits a notification of nonparticipation in DR to server 30 in S30, and thereafter the process returns to S11. In this case, external power feed (S18) which will be described later is not carried out. The notification of nonparticipation in DR is a notification to inform server 30 that vehicle 50 will not participate in DR. The main SOC being lower than the prescribed SOC value in this embodiment means that a remaining amount of power stored in main battery 131a is not sufficient for external power feed. When the main SOC is lower than the prescribed SOC value, ECU 150 in this embodiment does not allow discharging of main battery 131a (and external power feed). Overdischarging of main battery 131a (and accelerated deterioration of main battery 131a) can thus be suppressed.

When the main SOC is equal to or higher than the prescribed SOC value (YES in S13), in S14, ECU 150 determines whether or not the BT obtained in S11 is lower than a prescribed value (which is denoted as "T11" below). The BT being lower than T11 in this embodiment means that power output capability of main battery 131a is not sufficient for external power feed. Output from main battery 131a is restricted by Wout described previously. Power output capability of main battery 131a is varied depending on a temperature of main battery 131a. T11 in this embodiment corresponds to an exemplary "first temperature" according to the present disclosure.

When the BT is lower than T11 (YES in S14), in S15, ECU 150 performs the temperature increase control as described previously by having relay RY12 closed (connected) to drive heater 133 with electric power in sub battery 131b (battery power). During a period until the BT is equal to or higher than T11 (that is, while determination as YES is made in S14), temperature increase control is continually performed in S15. When the BT is equal to or higher than T11 (NO in S14), the process proceeds to S16.

In S16, ECU 150 determines whether or not the BT obtained in S11 is lower than a prescribed value (which is denoted as "T12" below). T12 represents a temperature higher than T11. When the BT is lower than T12 (YES in S16), the process proceeds to S18 through S17, and when the BT is equal to or higher than T12 (NO in S16), the process proceeds to S18 without performing S17. In S17, the temperature increase control is performed as in S15 described previously. In S18, ECU 150 controls charger-discharger 120 to carry out external power feed by using electric power in main battery 131a (battery power). External power feed in S18 means backfeeding from vehicle 50 to EVSE 40 (and power grid PG). External power feed in S18 is continually carried out until determination as NO is made in any one of S12 and S13. When the BT is lower than T12 (YES in S16), the temperature increase control is performed (S17) concurrently with external power feed, and when the BT is equal to or higher than T12 (NO in S16), the temperature increase control (S17) is no longer performed.

In this embodiment, hysteresis is set for a threshold value (T11 and T12) beyond which switching between performing the temperature increase control and not performing the temperature increase control is made. Even though the temperature of main battery 131a is equal to or higher than T11 owing to the temperature increase control, the temperature increase control is not immediately stopped. The temperature increase control is continued until the temperature of main battery 131a attains to T12. The temperature of main battery 131a becoming lower than T11 during external power feed is thus suppressed.

Figure 8:
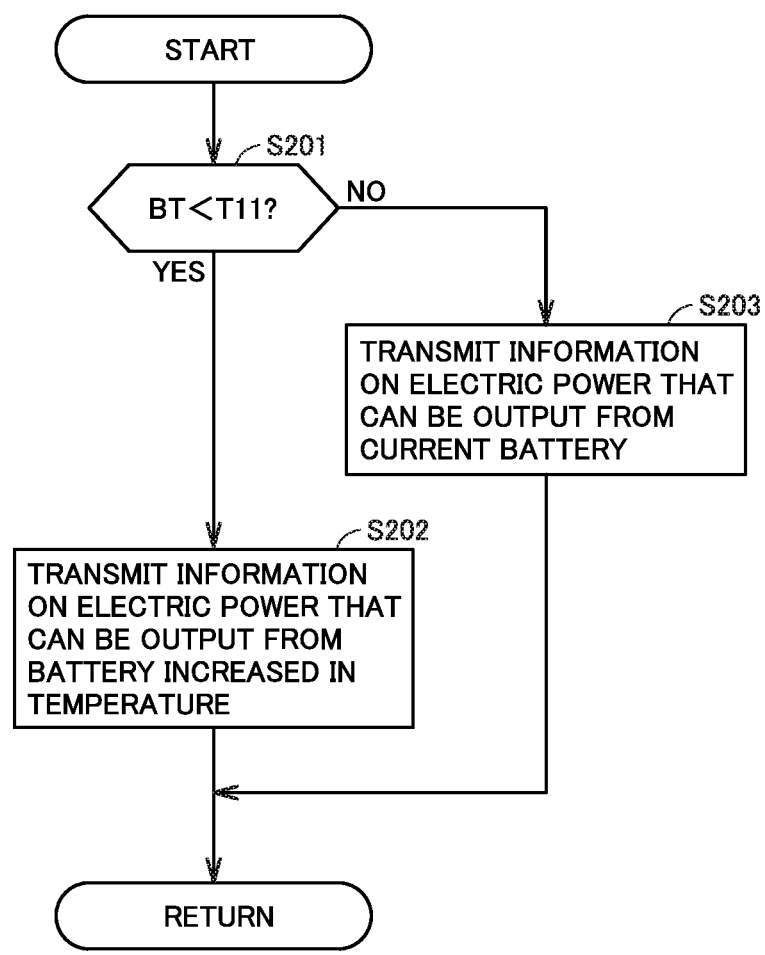
FIG. 8 is a flowchart showing details of processing in S20 shown in FIG. 7.

When the current time is not within the DR period (NO in S12), in S20, ECU 150 transmits information representing a DR capacity (more specifically, power feed capability information described previously) to server 30. FIG. 8 is a flowchart showing details of processing in S20.

Referring to FIG. 8, in S201, ECU 150 determines whether or not the BT obtained in S11 in FIG. 7 is lower than T11. Processing in S201 is the same as the processing in S14 in FIG. 7.

When the BT is lower than T11 (YES in S201), in S202, ECU 150 transmits to server 30 as power feed capability information, information indicating electric power that can be output from main battery 131a while the temperature of main battery 131a is at a prescribed value (which is denoted as "T13" below) equal to or higher than T11. This electric power indicated by the information is power output capability of main battery 131a increased in temperature. T13 may be, for example, not lower than T11 and not higher than T12, and for example, it may be equal to T11. ECU 150 can obtain power output capability of main battery 131a at temperature T13, for example, by referring to the Wout map described previously. When the BT is equal to or higher than T11 (NO in S201), in S203, ECU 150 transmits to server 30 as the power feed capability information, information indicating power output capability of current main battery 131a (that is, main battery 131a at temperature BT). ECU 150 can obtain power output capability of main battery 131a at temperature BT, for example, by referring to the Wout map described previously.

Referring again to FIG. 7, after processing in S20, in S21, ECU 150 determines whether or not the BT obtained in S11 is lower than a prescribed value (which is denoted as "T2" below). T2 represents a temperature lower than T11. In this embodiment, a boundary value between a temperature region where main battery 131a is not frozen and a temperature region where main battery 131a may be frozen is set as T2. The BT being lower than T2 means that main battery 131a may be frozen. T2 in this embodiment corresponds to an exemplary "second temperature" according to the present disclosure.

When the BT is lower than T2 (YES in S21), the process returns to S11 through S22, and when the BT is equal to or higher than T2 (NO in S21), the process returns to S11 without performing S22. In S22, ECU 150 drives heater 133 by having relay RY11 shown in FIG. 2 closed (connected) to allow supply of external electric power (that is, electric power input from EVSE 40 to inlet 110) to heater 133. Then, ECU 150 performs the temperature increase control as described previously by driving heater 133 with external electric power. When a DR signal is not requesting for external power feed and the temperature of main battery 131a is lower than T2 (NO in S12 and YES in S21) while vehicle 50 is in the stand-by state, ECU 150 in this embodiment performs the temperature increase control (S22) by using external electric power. When the temperature of main battery 131a is lower than T2 while vehicle 50 waits for a request for external power feed, ECU 150 performs the temperature increase control. Freezing of main battery 131a is thus suppressed. Since the temperature increase control is performed by using external electric power rather than battery power, shortage of battery power is suppressed. In S21 and S22 in FIG. 7, though hysteresis is not set for the threshold value beyond which switching between performing the temperature increase control and not performing the temperature increase control is made, hysteresis may be set.

Though processing for external power feed in accordance with a DR suppression signal (that is, the processing in FIG. 7) alone is mentioned in this embodiment, ECU 150 may perform processing (not shown) for external charging in accordance with a DR increase signal in parallel to the processing in FIG. 7.

As described above, when the temperature of main battery 131a is low (YES in S14), ECU 150 included in the electrically powered vehicle (vehicle 50) according to this embodiment performs the temperature increase control of main battery 131a (S15) before carrying out external power feed requested by a DR signal. Thus, sufficient output performance of main battery 131a is more likely to be secured at the time (S18) when external power feed requested by the DR signal is carried out. As the temperature increase control is performed by using battery power rather than external electric power, the temperature of main battery 131a can be increased without using an energy resource outside the vehicle. Vehicle 50 can thus perform the temperature increase control of main battery 131a in a manner suitable for energy management.

ECU 150 may determine whether or not to perform the temperature increase control and which of external electric power and battery power is to be selected in the temperature increase control, based on timing of start of external power feed indicated by a target DR signal (that is, a DR signal that requests for external power feed), the current time, and a temperature of main battery 131a. For example, ECU 150 may perform processing in FIG. 9 instead of the processing in FIG. 7 described previously.

Figure 9:
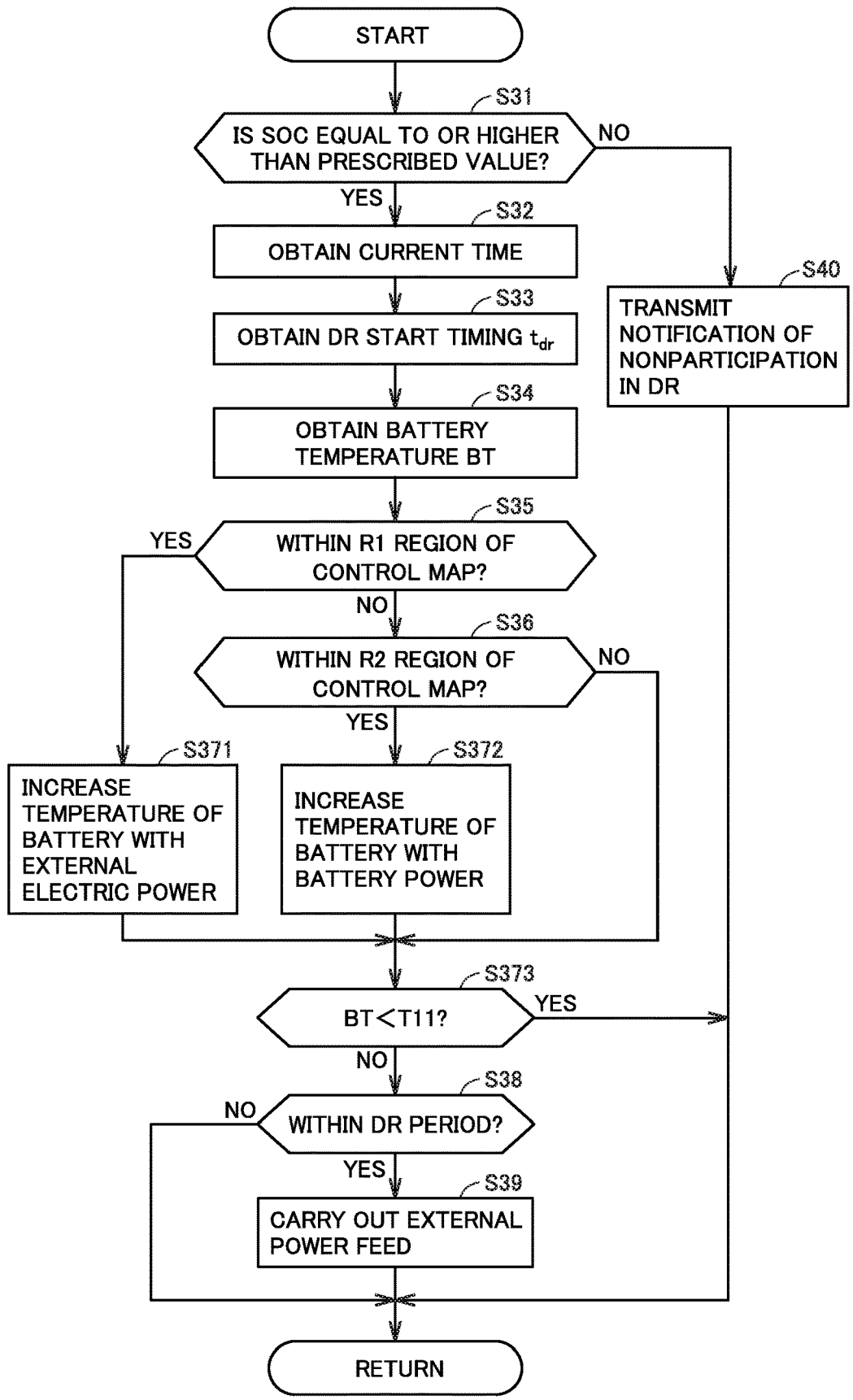
FIG. 9 is a flowchart showing a modification of the processing shown in FIG. 7.

FIG. 9 is a flowchart showing a modification of the processing shown in FIG. 7. Processing shown in this flowchart is repeatedly performed when both of a condition that vehicle 50 is parked in the externally chargeable and externally power-feedable state and a condition that vehicle 50 has received a target DR signal that indicates DR in which vehicle 50 can participate are satisfied.

Referring to FIG. 9 together with FIGS. 1 to 3, in S31, ECU 150 determines whether or not the main SOC is equal to or higher than a prescribed SOC value. Processing in S31 is the same, for example, as the processing in S13 in FIG. 7.

When the main SOC is equal to or higher than the prescribed SOC value (YES in S31), in S32, ECU 150 obtains the current time. ECU 150 may obtain the current time by using a real time clock (RTC) circuit (not shown) contained in ECU 150 or from the outside of the vehicle through communication.

In S33, ECU 150 obtains DR start timing (which is denoted as "$t_{dr}$" below) indicated by a target DR signal. In S34, ECU 150 obtains a BT (that is, a current temperature of main battery 131a). Then, ECU 150 determines whether or not to perform the temperature increase control and which of external electric power and battery power is to be selected in the temperature increase control, by referring to a control map stored in storage 153.

Figure 10:
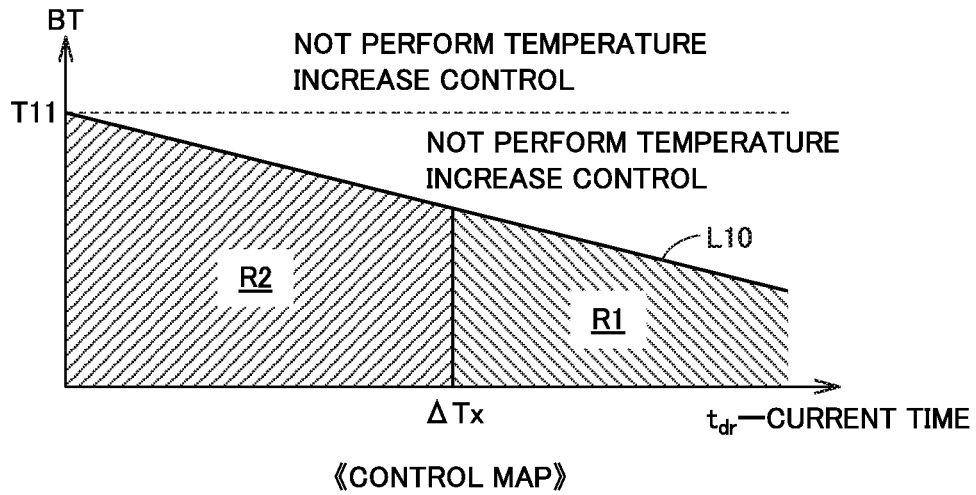
FIG. 10 is a diagram showing an exemplary control map used in the processing in FIG. 9.

FIG. 10 is a diagram showing an exemplary control map used in the processing in FIG. 9. In FIG. 10, the ordinate represents a BT. The abscissa represents a difference in time between $t_{dr}$ and the current time (which is denoted as "ΔT" below). ΔT means a time period (a time margin) from the current time to $t_{dr}$ (that is, timing of start of external power feed indicated by a target DR signal). ECU 150 obtains a BT, $t_{dr}$, and the current time in S34 in FIG. 9, S33 in FIG. 9, and S32 in FIG. 9, respectively.

Referring to FIG. 10, according to definition in this control map, the temperature increase control is not performed when the BT is higher than a line L10. The control map defines a region where ΔT is equal to or larger than ΔTx as an R1 region, in a region where the BT is equal to or lower than line L10. The R1 region represents a condition for the temperature increase control by using external electric power. This control map defines a region where ΔT is lower than ΔTx as an R2 region, in the region where the BT is equal to or lower than line L10. The R2 region represents a condition for the temperature increase control by using battery power.

Referring again to FIG. 9, in S35, ECU 150 determines whether or not the condition shown with the R1 region in the control map shown in FIG. 10 is satisfied, based on the current time, $t_{dr}$, and the BT obtained in S32 to S34 in the present processing routine. When the condition shown with the R1 region is satisfied (YES in S35), in S371, ECU 150 performs the temperature increase control by using external electric power. Thereafter, the process proceeds to S373. Processing in S371 is the same, for example, as the processing in S22 in FIG. 7. When the condition shown with the R1 region is not satisfied (NO in S35), ECU 150 determines whether or not the condition shown with the R2 region in the control map shown in FIG. 10 is satisfied, based on the current time, $t_{dr}$, and the BT obtained in S32 to S34 in the present processing routine (S36). When the condition shown with the R2 region is satisfied (YES in S36), in S372, ECU 150 performs the temperature increase control by using battery power. Thereafter, the process proceeds to S373. Processing in S372 is the same, for example, as the processing in S15 in FIG. 7. When the condition shown with the R2 region is not satisfied (NO in S36), the process proceeds to S373 without performing the temperature increase control.

In S373, ECU 150 determines whether or not the BT obtained in S34 is lower than T11. Processing in S373 is the same, for example as the processing in S14 in FIG. 7. When the BT is equal to or higher than T11 (NO in S373), the process proceeds to S38.

In S38, ECU 150 determines whether or not the current time is within the DR period. The DR period is indicated by the target DR signal. When the current time is within the DR period (YES in S38), in S39, ECU 150 carries out external power feed by using battery power (electric power in main battery 131a). Thereafter, the process returns to S31. Processing in S39 is the same, for example, as the processing in S18 in FIG. 7.

When the main SOC is lower than the prescribed SOC value (NO in S31), when the BT is lower than T11 (YES in S373), and when the current time is not within the DR period (NO in S38), in each case, the process returns to S31 without carrying out external power feed. When determination as NO is made in S31, in S40, ECU 150 transmits a notification of nonparticipation in DR to server 30. Processing in S40 is the same, for example, as the processing in S30 in FIG. 7.

According to the processing in FIG. 9 described above as well, temperature increase control of main battery 131a is performed in a manner suitable for energy management.

Figure 11:
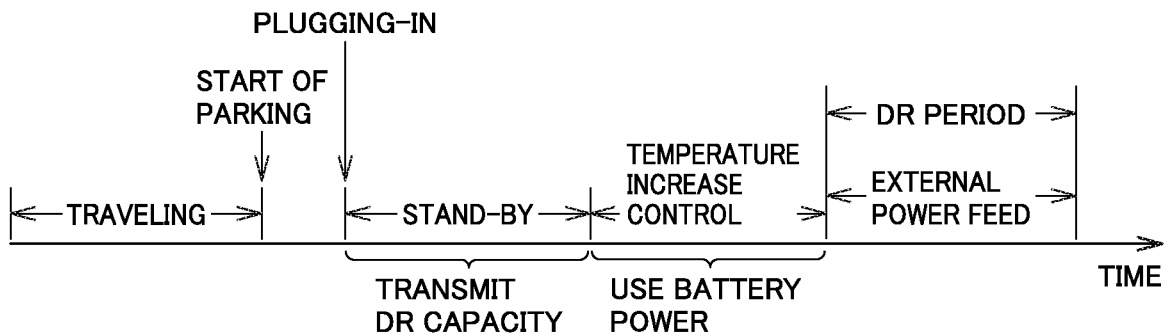
FIG. 11 is a diagram showing a first modification of the operation by the electrically powered vehicle shown in FIG. 5.

FIG. 11 is a diagram showing a first modification of the operation by the electrically powered vehicle shown in FIG. 5. As shown in FIG. 11, temperature increase control of main battery 131a may be performed before (for example, immediately before) DR start timing (that is timing of start of external power feed) indicated by the target DR signal.

Figure 12:
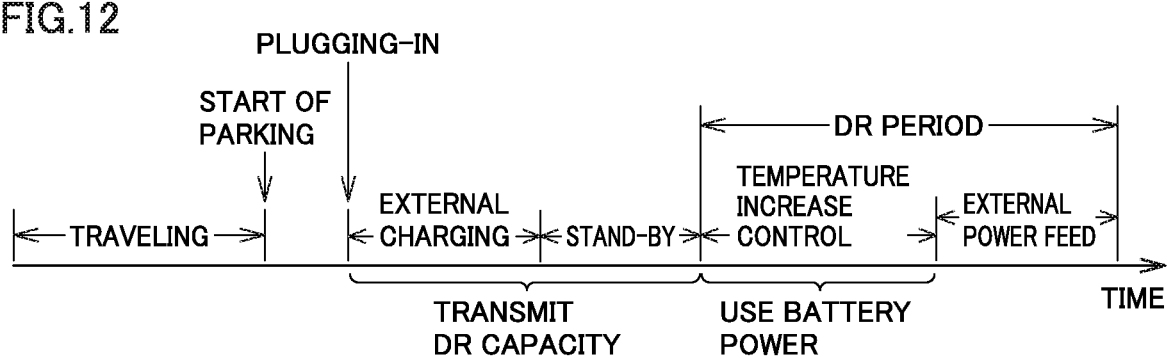
FIG. 12 is a diagram showing a second modification of the operation by the electrically powered vehicle shown in FIG. 5.

FIG. 12 is a diagram showing a second modification of the operation by the electrically powered vehicle shown in FIG. 5. As shown in FIG. 12, external charging of main battery 131a may be started by plugging in. By this external charging, the SOC of main battery 131a may be increased to a value sufficient for external power feed. In an electrically powered vehicle where such external charging is carried out, determination as to the SOC in carrying out external power feed (for example, S13 in FIG. 7 or S31 in FIG. 9) can be omitted.

In the embodiment, in the temperature increase control of main battery 131a, ECU 150 drives heater 133 with electric power in sub battery 131b (battery power). Without being limited as such, ECU 150 may perform the temperature increase control of main battery 131a by driving heater 133 with electric power in main battery 131a (battery power).

An approach to temperature increase of main battery 131a is not limited to an electric heater (for example, heater 133). For example, the temperature of main battery 131a may be increased by energization of main battery 131a (for example, repetition of charging and discharging). A bidirectional converter may be adopted as DC/DC converter 131c shown in FIG. 2. DC/DC converter 131c may convert (for example, up-covert) electric power supplied from sub battery 131b to DC power suitable for charging of main battery 131a and output DC power to main battery 131a. ECU 150 may control DC/DC converter 131c to repeat input and output of electric power between main battery 131a and sub battery 131b to thereby increase a temperature of main battery 131a.

The configuration of the electric power system is not limited to the configuration shown in FIG. 3. For example, the electric power system may determine contribution to power leveling with the use of a charging cable with a metering function, instead of or in addition to the smart meter. The electric power utility company may be divided for each business sector. A power generation utility and a power transmission and distribution utility included in the electric power system may belong to companies different from each other. Though the electric power utility company requests an aggregator to participate in DR in the embodiment, the power market may request an aggregator to participate in DR. The aggregator may make a profit by trading (for example, trading of a capacity or adjustment capability) in the power market.

In the embodiment, a DR signal with which an electric utility (for example, an electric power utility company or an aggregator) requests a demand side to level electric power is given as an exemplary leveling signal. A leveling signal, however, is not limited to such a DR signal. For example, a signal with which one demand side (for example, an individual or a company) requests another demand side (for example, an individual or a company) to level electric power may be applicable. Alternatively, a signal (for example, a signal that requests for external power feed at home) automatically transmitted from a communication apparatus at home to an electrically powered vehicle (or a portable terminal carried by a user) when an amount of power generation in a self-generation facility installed in the user's house (or an amount of electric power stored in the power storage) becomes small may be applicable.

The configuration of the electrically powered vehicle included in the electric power system is not limited to the configuration shown in FIGS. 1 and 2. For example, power conversion circuit 122 may be mounted on EVSE instead of the electrically powered vehicle.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. An electrically powered vehicle comprising:
a target battery that is externally chargeable and externally power feedable;
a sensor that detects a temperature of the target battery; and
a controller that performs charging control, discharging control, and temperature increase control of the target battery, wherein
the temperature increase control is control for increasing a temperature of the target battery by selecting any of external electric power and battery power and generating heat with the selected electric power, the external electric power being supplied from outside of the electrically powered vehicle, the battery power being stored in the target battery or a battery mounted on the electrically powered vehicle other than the target battery,
the controller receives a signal that requests for power leveling, and
when the temperature of the target battery is lower than a first temperature during external power feed requested by the signal, the controller performs the temperature increase control by using the battery power before the external power feed requested by the signal.

2. The electrically powered vehicle according to claim 1, further comprising an electric heater that heats the target battery with electricity, wherein
in the temperature increase control, the controller drives the electric heater by supply of the selected electric power to the electric heater and controls the electric heater to generate heat for increasing the temperature of the target battery.

3. The electrically powered vehicle according to claim 1, wherein
when current time is within a period during which the signal requests for the external power feed and the temperature of the target battery is lower than the first temperature while the electrically powered vehicle is parked in an externally chargeable and externally power-feedable state, the controller performs the temperature increase control to increase the temperature of the target battery to the first temperature or higher by using the battery power and thereafter carries out the external power feed by allowing the target battery to discharge.

4. The electrically powered vehicle according to claim 1, wherein
when current time is not within a period during which the signal requests for the external power feed and the temperature of the target battery is lower than a second temperature while the electrically powered vehicle is parked in an externally chargeable and externally power-feedable state, the controller performs the temperature increase control by using the external electric power.

5. The electrically powered vehicle according to claim 1, wherein
when the temperature of the target battery is lower than the first temperature, the controller transmits to outside of the electrically powered vehicle, information indicating electric power that can be output from the target battery while the temperature of the target battery is equal to or higher than the first temperature.

6. The electrically powered vehicle according to claim 1, wherein
the controller determines whether to perform the temperature increase control and which of the external electric power and the battery power is to be selected in the temperature increase control, based on timing to start the external power feed indicated by the signal that requests for the external power feed, current time, and the temperature of the target battery.

7. The electrically powered vehicle according to claim 1, wherein
when an SOC of the target battery is lower than a prescribed SOC value, the controller does not allow the target battery to discharge.

* * * * *